May 23, 1944.    R. D. MacDONALD    2,349,361
HITCH
Filed May 9, 1942

Inventor:
Raymore D. MacDonald
By Paul O. Pippel
Atty.

Patented May 23, 1944

2,349,361

UNITED STATES PATENT OFFICE 2,349,361

HITCH

Raymore D. MacDonald, Battle Creek, Mich., assignor to International Harvester Company, a corporation of New Jersey Application May 9, 1942, Serial No. 442,311

3 Claims. (Cl. 280—33.4)

This invention relates to a hitch and supporting means for use with a transportable unit. More particularly the invention relates to a means which is capable of use both as a hitch means and as a supporting means in a transportable unit of the type in which one end of the unit is equipped with a rolling ground support and the other end of which must necessarily be otherwise supported in certain circumstances.

Representative of the type of unit referred to is an ensilage cutter. A machine of this type must often be used in different locations on the average farm and to that end is provided with a rolling ground support to enable the machine to be moved from place to place. Since the machine is quite heavy, its other end is provided with means by which it may be attached to a tractor or the like. Since the tractor must be used elsewhere, it is necessary that it be disconnected from the ensilage cutter, in which case the end of the cutter must be supported by whatever means can be presently improvised. According to the present invention, means are provided which serve the dual purpose of adapting this end of the cutter or like unit for connection to a draft vehicle or other auxiliary support and of providing means carried by the cutter for supporting that end of the cutter when the same is disconnected from the tractor or other former support. Vehicle trailers and certain other agricultural machines are similar to the ensilage cutter referred to, in that all require some form of supporting means upon disconnection from the source of draft power.

The principal object of the invention is to provide an improved hitch and supporting means of the type referred to above.

An important object is to provide this means in the form of a member having a portion serving in one position to adapt the unit for connection to a tractor or the like and in another position to support the unit when disconnected from the tractor.

And, another object is to provide this means with adjustable means so that the unit may be supported at various heights from the ground.

A further understanding of the foregoing and other objects of the invention may be had from the following detailed description and accompanying sheet of drawings, in which.

As stated above, the ensilage cutter chosen for the purpose of illustration and description is merely representative of a large class of similar vehicles or transportable units to which the invention may be adapted, and it is accordingly not intended to limit the invention by the following reference to a specific utility of the invention.

Figure 1:
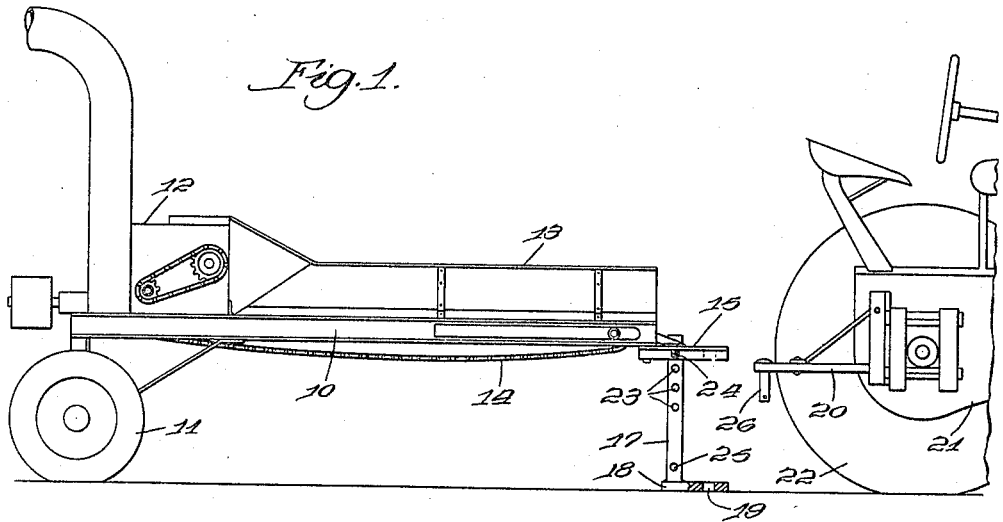
Figure 1 is a side elevational view of an ensilage cutter of conventional construction, shown in relation to the rear portion of a tractor.

The transportable unit shown in Figure 1 is an ensilage cutter of conventional construction comprising a horizontal main frame 10 carried at one end on a rotatable ground support 11, preferably consisting of a pair of transversely spaced wheels. The ensilage cutter includes the usual housing 12 in which is housed the cutting mechanism and horizontal bed or platform 13 over which material is fed by a conveyer 14 to the cutting mechanism in the housing 12. The other end of the main frame 10 has heretofore been equipped with no particular supporting means, this end being supported on whatever type of support could be improvised. According to the present invention, means have been provided for supporting this end of the cutter.

Figures 2, 3:
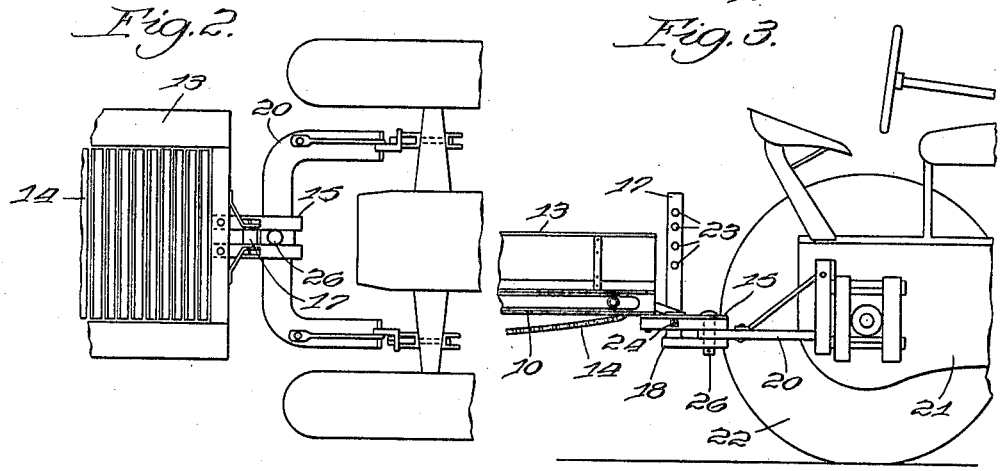
Figure 2 is a plan elevational view of the forward portion of the cutter in position as attached to a tractor draw-bar.
Figure 3 is a side elevational view of the structure shown in Figure 2.

This end of the cutter is provided with supporting structure including a bracket 15 having a forwardly extending portion provided with an opening or aperture 16 on a vertical axis. The bracket 15 serves to carry a supporting means comprising a vertical leg portion 17 and a lower foot portion 18. The foot portion is apertured at 19 on a vertical axis and when this portion is in the position shown in Figures 3 and 4 the aperture 19 is in vertical alinement with the aperture 16 in the bracket or connecting portion 15. In this position of the parts, means in the form of a clevis or equivalent connecting means is provided for connecting the normally unsupported end of the ensilage cutter to a draw-bar 20 of a conventional type tractor. This tractor is illustrated in the drawing as comprising the usual main frame structure 21 carried on rear traction wheels 22. The draw-bar 20 is connected to the main frame 21 in any suitable manner.

Figure 4:
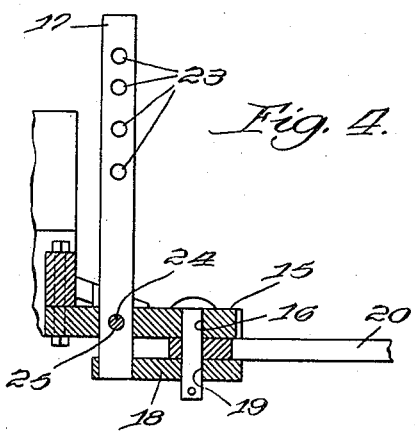
Figure 4 is an enlarged view partially in section showing the detailed structure of the hitch and supporting means.

The leg portion 17 of the supporting means is provided with a plurality of transversely disposed vertically spaced openings 23. The bracket or connecting portion 15 is provided with a transversely extending opening adapted to carry a transverse pin 24, this pin providing locking means upon cooperation with a selected opening 23. As shown in Figure 4, the leg portion is provided with an opening 25 near its lower end. The pin 24 is adapted to engage this opening when the leg is moved to the position shown in Figures 3 and 4, in which position the foot 18 cooperates with the bracket 15 to provide a clevis for connection to the tractor, previously referred to. When the cutter or equivalent unit is attached to the tractor or other auxiliary support by means of the clevis formed by the parts 15 and 16, a connecting pin 26 may be dropped through the alined apertures 16 and 19 and through a cooperating aperture in the tractor draw-bar 20.

When the cutter is to be moved from one locality to another, the connection between the cutter and the tractor is made by the clevis means just described. In this case the supporting means comprising the leg 17 and foot 18 is locked in its upper position by engagement of the pin 24 with the opening 25. When it is desired to disconnect the tractor, the pin 24 is removed and the leg allowed to drop until the foot 18 engages the ground, after which the pin 24 may be restored to its position in the bracket 15 in engagement with an appropriate opening 23. The clevis pin 26 may be withdrawn and the tractor may be driven away.

It will be seen from the foregoing description that a desirable type of hitch and supporting means has been provided for a unit of a particular type as disclosed. It will be understood of course that the invention may be suitably adapted to various types of units, such as other agricultural machines or vehicle trailers in which the main characteristic is a support at one end and no support at the other end, except in so far as the latter support is provided by the present invention. It will be further understood that the normally unsupported end of any type unit may be supported by means of the invention on either the leg and foot 17 and 18 for stationary use of the unit or may be carried by any other auxiliary support, such as the tractor illustrated, during the use of the unit in other circumstances. Still further, it will be understood that the foregoing description and drawing have illustrated only a preferred embodiment of the invention and that numerous modifications and alterations can be made therein without departing from the spirit and scope of the invention as defined in the appended claims.

What is claimed is:

1. For use with a transportable unit having a rolling ground support at one end: means for supporting the other end of the unit on either the ground or on the draft element of a vehicle, comprising a first member connected to said end of the unit and having an aperture, a second member, means connecting said second member to the said end of the unit for vertical movement between an upper position adjacent the first member and a lowered position adjacent the ground, said second member being apertured and adapted to cooperate with the apertured first member to form a clevis for connection to a draft element, means adapting the second member for engagement with the ground when in lowered position, and means for locking the second member in lowered position for the supporting of said end of the unit when disconnected from the draft element.

2. For use with a transportable unit having a rolling ground support at one end: means for supporting the other end of the unit on either the ground or on the draft element of a vehicle, comprising a first member connected to said end of the unit and having an aperture, a second member in the form of a leg having a foot portion, means mounting said leg on the said end of the unit for vertical adjustment between an upper position with the foot portion adjacent the first member and a lowered position with the foot portion engaging the ground, said foot portion being adapted to cooperate with the apertured first member to form a clevis for connection to a draft element, and means for locking the second member in lowered position for the supporting of said end of the unit when disconnected from the draft element.

3. For use with a transportable unit having a rolling ground support at one end: means for supporting the other end of the unit on either the ground or on the draft element of a vehicle, comprising a first member connected to said end of the unit and having a connecting portion, a second member having a vertical leg portion and a foot portion, said leg having a plurality of vertically spaced apertures therein, means supporting the leg on said end of the unit for vertical sliding adjustment, and means cooperable with the apertures in the leg for locking the leg in any one of a plurality of positions including a lowered position in which the foot portion engages the ground and an upper position in which the foot portion is adjacent to and adapted to cooperate with the connecting portion of the first member for providing means to connect the unit to a vehicle draft element.

RAYMORE D. MACDONALD.